No. 819,358. PATENTED MAY 1, 1906.
J. MacDOUGALL
METHOD OF CLEANING FILTERS.
APPLICATION FILED APR. 5, 1900.
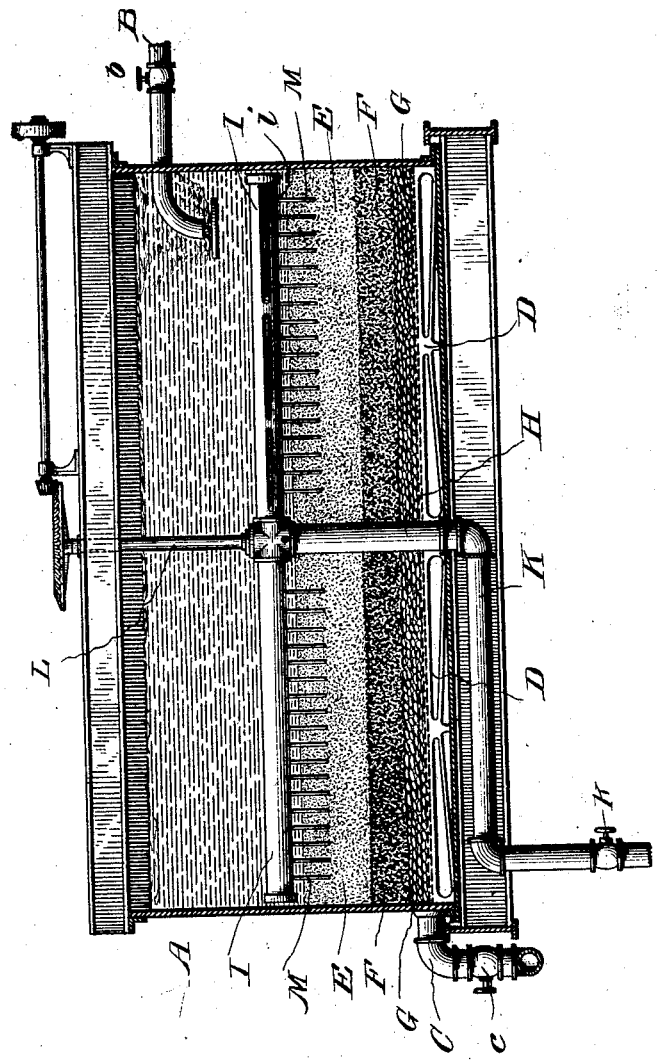
Witnesses:
Fenton S. Belt,
J. L. Lawlor.
Inventor:
John MacDougall, by
Chas. J. Williamson, his Atty.

UNITED STATES PATENT OFFICE.

JOHN MacDOUGALL, OF DETROIT, MICHIGAN, ASSIGNOR, BY DIRECT AND MESNE ASSIGNMENTS, TO FRANK E. KIRBY, OF DETROIT, MICHIGAN, AND WILLIAM W. NEAR, OF MONTREAL, CANADA.

METHOD OF CLEANING FILTERS.

No. 819,358.      Specification of Letters Patent.      Patented May 1, 1906.

Application filed April 5, 1900. Serial No. 11,721.

*To all whom it may concern:*

Be it known that I, JOHN MACDOUGALL, of Detroit, in the county of Wayne and in the State of Michigan, have invented certain new and useful Improvements in Methods of Cleaning Filters; and I do hereby declare that the following is a full, clear, and exact description thereof, reference being had to the accompanying drawing, in which the figure is a vertical section of a filter, in the cleaning of which my method may be practiced.

The object of my invention is to provide a method of cleaning filters by which a minimum of water for washing will be required; and to this end my invention consists in the method employed, substantially as hereinafter specified and claimed.

For illustrating my invention I show a construction of filter such as appears in my application for United States patent filed March 16, 1900, Serial No. 9,306; but it is to be understood that this selection is merely for illustration of the invention and is not to be taken as restricting the scope thereof. Such filter comprises a tank A, having an inlet-pipe B for the water to be filtered, which has a valve $b$ and an outlet-pipe C for the filtered water, having a valve $c$. Within the tank and resting upon a suitable false bottom or support D is a bed of filtering material formed, preferably, of a top layer E of fine filtering sand, a second layer F of coarse sand, and a third layer G of broken stone, which rests directly on the false bottom.

At the center of the tank is a vertical pipe H, which extends through the filter-bed, and just above the latter has connected with it two oppositely-extending horizontal pipes I and I, which reach close to the wall of the tank and each of which has in one side a slot or slots $i$ and $i$. The pipe H at its lower end is in communication with a pipe K, that passes through the bottom of the tank and which has a valve $k$. The pipes I and I have a pivotal connection with the pipe H to permit of their revolution around the tank, and for revolving them they are secured to a shaft L, which receives motion from a suitable source of power.

Projecting downward from the pipes I and I are fingers or teeth M and M of a length to reach into the filter-bed to the extent to which it is befouled, which fingers by the revolution of the pipes I and I agitate or stir the befouled portion of the filter-bed.

In the operation of filtering the valves in the inlet and outlet pipes are kept open and that in the pipe K kept closed. When, however, the filter requires cleaning because of the accumulation of matter in the filter-bed, the valve $b$ in the inlet-pipe B is closed to stop the influx of water to the filter and the water in the latter allowed to filter out until it reaches a level a short distance above the pipes I and I, and then the valve $c$ in the outlet-pipe C is closed. The filter-bed is then agitated by the revolution of the stirring device to loosen up and dislodge the accumulated matters and to cause their commingling with the body of water still present at or near and above the surface of the filter-bed, and when this treatment has been carried to the desired degree, as evidenced by the condition of such water, the valve $k$ in the pipe K is opened to permit the dirty water to flow off through the pipes I and I as they revolve, and thence flowing through the pipe K to some suitable place of discharge. Thus far it will be seen no water has been required to be used in washing except the small portion left in the filter, as above described, and yet a large proportion of the sediment has been removed. Continuing the process to complete the washing, filtered water by pumping or otherwise is forced through the effluent-pipe C or a pipe provided for the purpose back into the filter at such a rate as not to disturb the bed, but sufficient to carry such sediment as may still be present up out of the same, where it can enter the pipes I and I and thus flow with the water out of the filter. During this last-described operation the agitation of the filter-bed is kept up by the revolution of the pipes I and I; but the rate at which the latter are moved is preferably much slower than during the first stage of the process. Owing to the degree to which the cleaning is effected by the first part of the process, but a comparatively small portion of filtered or wash water is required in the cleaning operation.

I have found that the fouling of filter-beds extends only partially therein, and hence that it is not necessary to agitate or stir the bed below the level where it is befouled; and accordingly I prefer to stir or agitate only the befouled portion, although I do not of course restrict the scope of the invention to the stirring of only a portion of the bed. It is also preferable as conducing to the most economical use of wash-water to remove the latter after washing at a level comparatively close to the surface of the filter-bed; but I do not restrict myself to this.

Having thus described my invention, what I claim is—

1. The method of cleaning filter-beds, which consists in agitating only the befouled portion of the bed in the presence of a fixed quantity of water, removing the dirty water that results, and then passing pure water through the bed from the bottom upward, and removing it at a level close to the surface of the bed, substantially as and for the purpose described.

2. The method of cleaning filter-beds, which consists in agitating only the upper portion of the filter-bed in the presence of water before it has been filtered, removing the befouled water which results, and then passing pure water upward through the bed.

3. The method of cleaning filter-beds, which consists in agitating the upper portion of the filter-bed in the presence of a fixed quantity of water, removing the befouled water which results, and then washing the bed by passing pure water therethrough from the bottom upward.

4. The method of cleaning filter-beds, which consists in stopping the influx of water to be filtered, stopping its efflux when a predetermined level above the bed is reached, agitating the upper portion of the bed only, removing the befouled water which results, and then passing filtered water through the bed from the bottom upward.

In testimony that I claim the foregoing I have hereunto set my hand this 5th day of April, A. D. 1900.

JOHN MacDOUGALL.

Witnesses:
JAS. E. HUTCHINSON,
CHAS. J. WILLIAMSON.